(12) United States Patent
Ballard

(10) Patent No.: US 6,950,854 B2
(45) Date of Patent: Sep. 27, 2005

(54) DIAL BACK E-MAIL SYSTEM USING BINARY PROTOCOL

(75) Inventor: Clinton L. Ballard, Suquamish, WA (US)

(73) Assignee: eAcceleration Software, Poulsbo, WA (US)

( * ) Notice: Subject to any disclaimer, the term of this patent is extended or adjusted under 35 U.S.C. 154(b) by 754 days.

(21) Appl. No.: 09/878,047

(22) Filed: Jun. 7, 2001

(65) Prior Publication Data

US 2002/0188687 A1 Dec. 12, 2002

(51) Int. Cl.[7] .............................................. G06F 15/16
(52) U.S. Cl. ..................... 709/206; 709/218; 709/247; 340/7.29; 379/93.24; 379/100.08
(58) Field of Search ................ 709/218, 206, 709/247; 340/7.29; 379/93.24, 100.08

(56) References Cited

U.S. PATENT DOCUMENTS

| | | | | | |
|---|---|---|---|---|---|
| 5,293,250 | A | * | 3/1994 | Okumura et al. | 358/402 |
| 5,764,906 | A | * | 6/1998 | Edelstein et al. | 709/219 |
| 5,844,969 | A | * | 12/1998 | Goldman et al. | 379/93.24 |
| 5,933,478 | A | * | 8/1999 | Ozaki et al. | 379/93.24 |
| 5,937,162 | A | * | 8/1999 | Funk et al. | 709/206 |
| 6,047,326 | A | * | 4/2000 | Kilkki | 709/228 |
| 6,067,561 | A | * | 5/2000 | Dillon | 709/206 |
| 6,073,142 | A | * | 6/2000 | Geiger et al. | 715/500 |
| 6,108,709 | A | * | 8/2000 | Shinomura et al. | 709/239 |
| 6,185,605 | B1 | * | 2/2001 | Kowaguchi | 709/206 |
| 6,272,530 | B1 | * | 8/2001 | Horiuchi et al. | 709/206 |
| 6,363,414 | B1 | * | 3/2002 | Nicholls et al. | 709/206 |
| 6,389,276 | B1 | * | 5/2002 | Brilla et al. | 455/413 |
| 6,553,006 | B1 | * | 4/2003 | Kalliokulju et al. | 370/310 |
| 6,630,883 | B1 | * | 10/2003 | Amin et al. | 340/7.29 |
| 6,714,793 | B1 | * | 3/2004 | Carey et al. | 455/466 |
| 6,779,178 | B1 | * | 8/2004 | Lloyd et al. | 717/174 |
| 2002/0188687 | A1 | * | 12/2002 | Ballard | 709/206 |

FOREIGN PATENT DOCUMENTS

| | | | | |
|---|---|---|---|---|
| EP | 1259036 | * | 3/2001 | H04L/12/58 |
| EP | 1233584 | * | 8/2002 | H04L/12/58 |
| EP | 1259036 | * | 11/2002 | H04L/12/58 |

* cited by examiner

*Primary Examiner*—Zarni Maung
*Assistant Examiner*—Backhean Tiv
(74) *Attorney, Agent, or Firm*—Steven P. Koda

(57) ABSTRACT

A sender prepares a message, then transmits an e-mail notice to the receiver and the e-mail message to a forwarding server. The "e-mail notice" is a short message, including a message ID and specifically does not include the complete prepared message. The "e-mail message" is in binary format and also includes the message ID of the corresponding e-mail notice. The receiving user receives the e-mail notice, then contacts the forwarding server to receive the e-mail message corresponding to the message ID within the received e-mail notice.

13 Claims, 7 Drawing Sheets

Forwarding Server

Destination

Source

DIAL BACK E-MAIL SYSTEM USING BINARY PROTOCOL

BACKGROUND OF THE INVENTION

This invention relates to user messaging systems over a global information network, and more particularly to an accelerated electronic mail system implemented over a global information network.

There are many protocols for routing information over a global information network, such as the internet. E-mail is a widely used electronic messaging system. Despite its popularity, the technologies for e-mail are old dating back into the 1960's or 1970's. Conventional e-mail uses a standardized protocol known as UUencoding, which inflates the size of a file so as to use the ascii character set. Given the increasing volume of e-mail traffic over the internet, it is desirable to implement a messaging system which is more efficient, such as by using less bandwidth.

SUMMARY OF THE INVENTION

According to the invention, an electronic messaging system for a global information network, such as the internet, is implemented using a binary protocol. To send a message, one end user (sending user) prepares the message for another end user (receiving user), then issues a command to transmit the message. According to one aspect of this invention, in response to the transmit command, an e-mail application automatically prepares an e-mail notice and forwards the e-mail notice to the receiving user's destination e-mail address. The e-mail application is run at the sending user's computer, a gateway computer to which the sender is networked, or the sender's internet service provider.

For purposes of clarity, the following naming conventions are used herein. "Prepared message" refers to the information prepared by the end user, such as typed in text, and attached files (e.g., text files, graphic files, executable files). The "e-mail notice" means the short message which includes the message ID and specifically does not include the complete prepared message. In some embodiments it does include a subject description prepared by the sending user or an abbreviated form of the prepared message. The "e-mail message" is the prepared message as formatted, and as packaged with header or other transmission or accounting information. The e-mail message is in binary format using a protocol supporting the binary format. In some embodiments the formatting of the prepared message includes being compressed. The e-mail message also includes the message ID of the corresponding e-mail notice.

According to another aspect of the invention, the sender's e-mail application also prepares the e-mail message from the prepared message, then commences transmission of the e-mail message to a forwarding server.

According to another aspect of the invention, the receiving user receives the e-mail notice, such as upon logging onto the global information network. Either automatically or upon instigation by the receiving user, an e-mail application on behalf of the receiving user contacts the forwarding server to receive the e-mail message corresponding to the message ID within the received e-mail notice.

According to one advantage of the invention, using a binary protocol has the advantage of being very compressible using standard compression algorithms. According to another advantage of the invention, global information network bandwidth used for electronic messaging is reduced.

These and other aspects and advantages of the invention will be better understood by reference to the following detailed description taken in conjunction with the accompanying drawings.

DESCRIPTION OF SPECIFIC EMBODIMENTS

Host Network Environment

Figure 1:
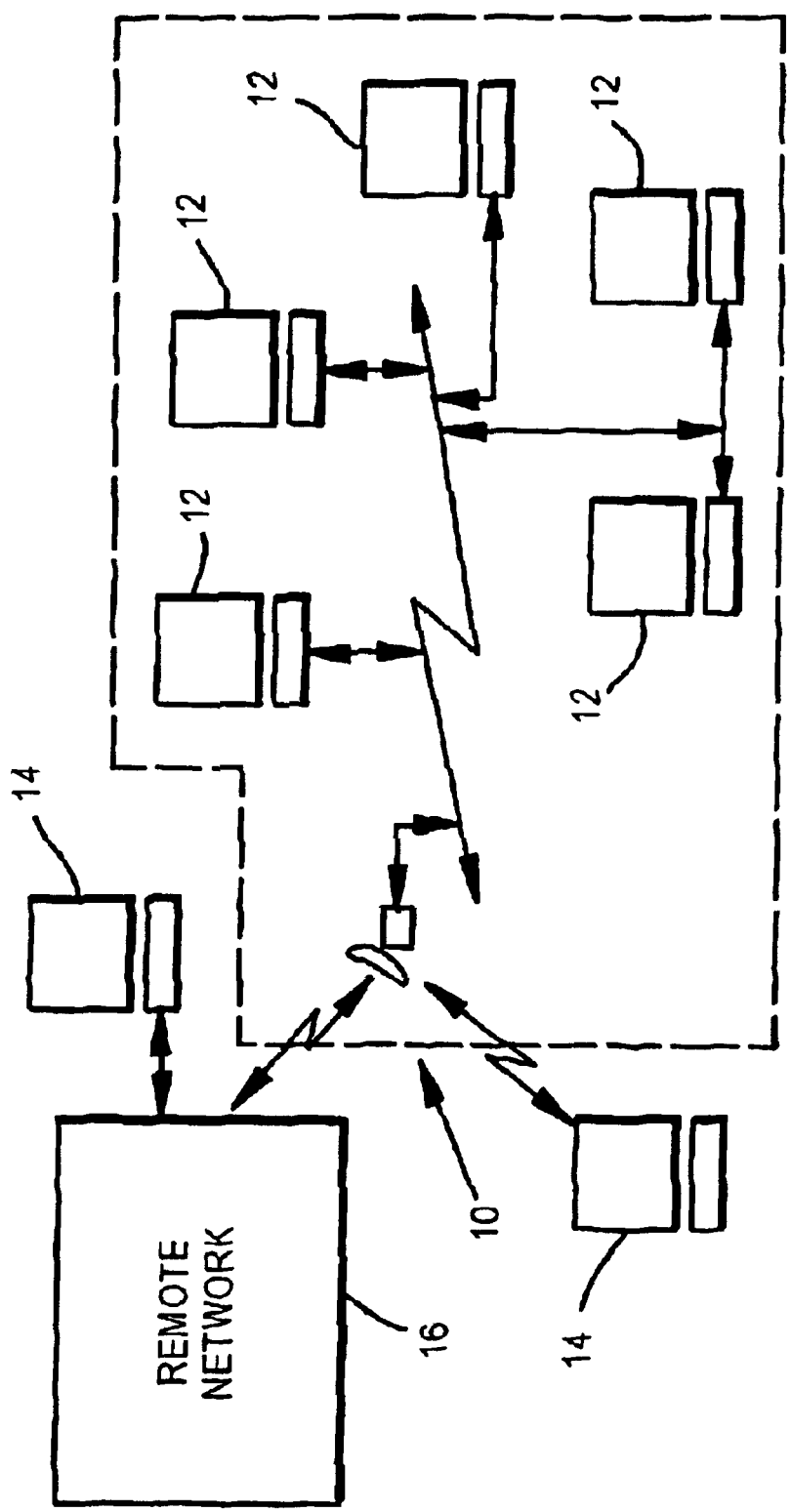
FIG. 1 is a schematic diagram of an exemplary wide area network hosting the method of this invention.

FIG. 1 shows a wide area network 10 formed by a plurality of network server computers 12 which are interlinked. Each network server computer 12 stores documents accessible to other network server computers 12 and to client computers 14 and networks 16 which link into the wide area network 10. The configuration of the wide area network 10 may change over time as client computers 14 and one or more networks 16 connect and disconnect from the network 10. For example, when a client computer 14 and a network 16 are connected with the network servers computers 12, the wide area network includes such client computer 14 and network 16. As used herein the term computer includes any device or machine capable of accepting data, applying prescribed processes to the data, and supplying results of the processes.

The wide area network 10 stores information which is accessible to the network server computers 12, remote networks 16 and client computers 14. The information is accessible as documents. The term document as used herein, includes files (as per the Windows operating system usage), documents (as per the MacOS operating system usage), pages (as per the web phraseology usage), and other records, entries or terminology used to describe a unit of a data base, a unit of a file system or a unit of another data collection type, whether or not such units are related or relational.

The network server computers 12 are formed by main frame computers minicomputers, and/or microcomputers having one or more processors each. The server computers 12 are linked together by wired and/or wireless transfer media, such as conductive wire, fiber optic cable, and/or microwave transmission media, satellite transmission media or other conductive, optic or electromagnetic wave transmission media. The client computers 14 access a network server computer 12 by a similar wired or a wireless transfer medium. For example, a client computer 14 may link into the wide area network 10 using a modem and the standard telephone communication network. Alternative carrier systems such as cable and satellite communication systems also may be used to link into the wide area network 10. Still other private or time-shared carrier systems may be used. In one embodiment the wide area network is a global information network, such as the internet. In another embodiment the wide area network is a private intranet using similar protocols as the internet, but with added security measures and restricted access controls. In still other embodiments the wide area network is a private, or semi-private network using proprietary communication protocols.

The client computer 14 is any end user computer, and may also be a mainframe computer, minicomputer or microcomputer having one or more microprocessors. The remote network 16 may be a local area network, a network added into the wide area network through an independent service provider (ISP) for the internet, or another group of computers interconnected by wired or wireless transfer media having a configuration which is either fixed or changing over time. Client computers 14 may link into and access the wide area network 10 independently or through a remote network 16.

Computer System

Figure 2:
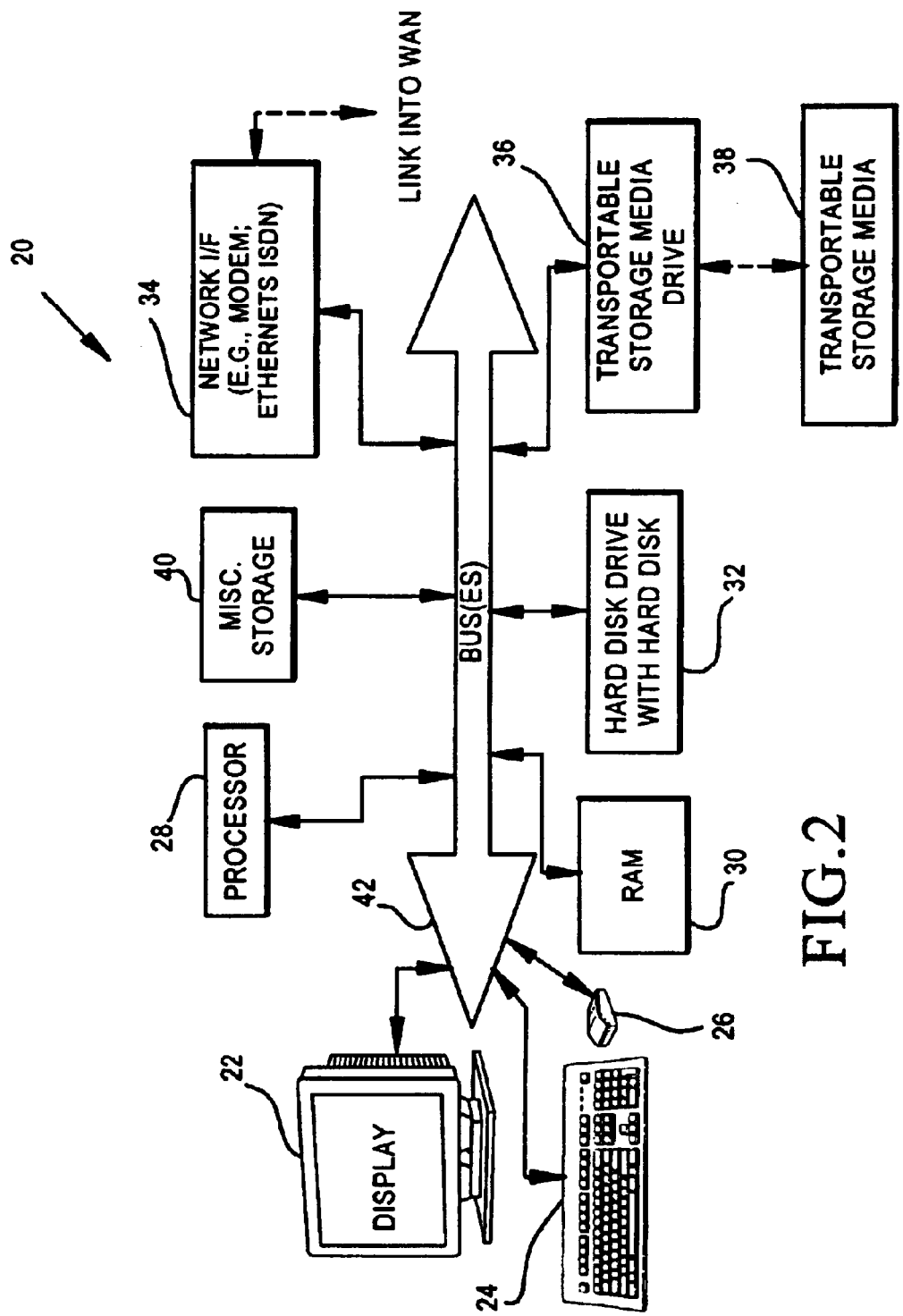
FIG. 2 is a block diagram of a computer system for a computer connected into the network of FIG. 1.

The functions of the present invention preferably are performed by programmed digital computers of the type which are well known in the art, an example of which is shown in FIG. 2. A computer system 20 has a display monitor 22, a keyboard 24, a pointing/clicking device 26, a processor 28, random access memory (RAM) 30, a non-volatile storage device such as a hard disk drive 32, a communication or network interface 34 (e.g., modem; ethernet adapter), and a transportable storage media drive 36 which reads transportable storage media 38. In addition other miscellaneous storage devices 40, such as a floppy disk drive, CD-ROM drive, zip drive, bernoulli drive or other magnetic, optical or other storage media, may be included. The various components interface and exchange data and commands through one or more busses 42. The computer system 20 receives information by entry through the keyboard 24, pointing/clicking device 26, the network interface 34 or another input device or input port. The computer system 20 may be any of the types well known in the art, such as a mainframe computer, minicomputer, or microcomputer and may serve as a network server computer 12, remote network 16 computer or a client computer 14. The computer system 20 may even be configured as a workstation, personal computer, network server, or a reduced-feature network terminal device.

Mail-Messaging System

Figure 3:
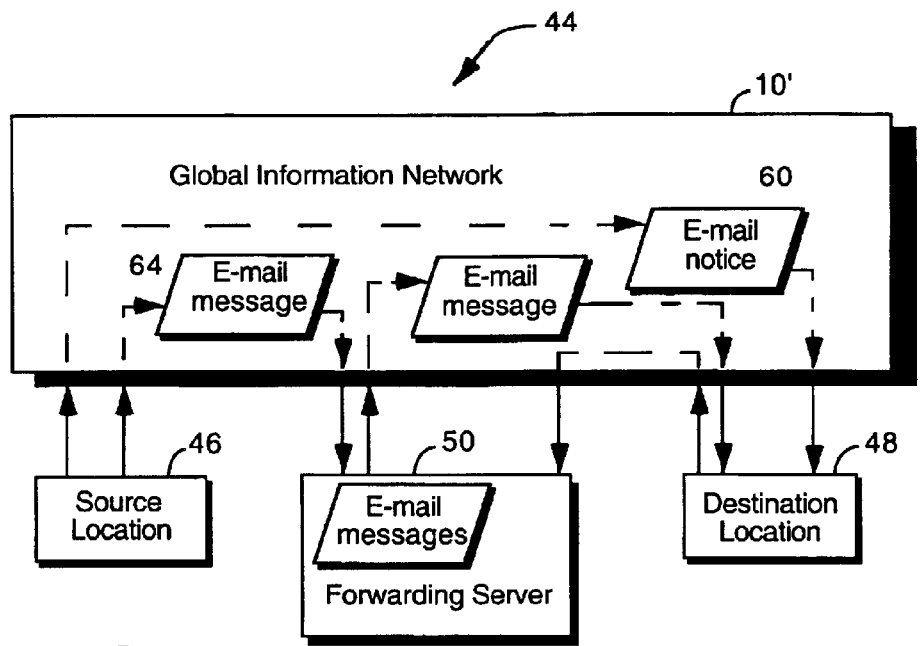
FIG. 3 is a block diagram of a global information network mail-messaging system configuration according to an embodiment of this invention.

Referring to FIG. 3, the network 10 of FIG. 1 is shown as a global information network 10' embodying a mail-messaging system 44, according to an embodiment of this invention. There are three functional locations involved in the messaging system: a source location 46, a destination location 48 and a forwarding server 50. The source location 46 is any computer generating an electronic mail message according to this invention. The destination 48 is any computer receiving an electronic mail message according to this invention. In various examples, the source location 46 is any end user device having direct or indirect access to the global information network 10'. Exemplary devices include the computer 20 of FIG. 2, a terminal, a cellular telephone. Similarly, the destination location 48 is any end user device having direct or indirect access to the global information network 10'. Specific examples of a source or destination location include an end user computer coupled to an internet service provider, an end user computer having a direct connection and end user computer which is part of a network having a gateway to the global information network 10'. The source location 46 includes a device having a global information network address used for identifying the source of the mail message, the device at which an end user prepares the mail message, and any devices which format the message prior to sending the mail message, (e.g., the gateway or ISP). The destination location 48 includes a device having a global information network address used for identifying the destination of the mail message and the device at which an end user requests access to the message. The forwarding server 50 is a computer system 20 serving as an intermediary in the mail messaging system 44.

The following terms are used concerning the mail messages. "Prepared message" refers to the information prepared by the end user, such as typed in text, and attached files (e.g., text files, graphic files, executable files). It does not refer to any formatting or packaging. "E-mail notice" refers to a short message which includes the message ID and specifically does not include the complete prepared message. In a preferred embodiment the e-mail notice does not include any of the prepared message. In some embodiments, however, the e-mail notice does include a subject description prepared by the sending user or an abbreviated form of the prepared message. The "e-mail message" is the prepared message as formatted, and as packaged with header or other transmission or accounting information. The e-mail message is in binary format using a protocol supporting the binary format. Binary format is distinguished from ascii format. Examples of protocols supporting binary formatting include the file transfer protocol (FTP) and the hypertext transmission protocol (HTTP). These are distinguished, for example, from the UUencoding protocol which is designed to use the ascii format. Binary format has the advantage of being very compressible using standard compression algorithms. Accordingly, in some embodiments the formatting of the prepared message includes being compressed.

Mail-Messaging Method

Figure 4:
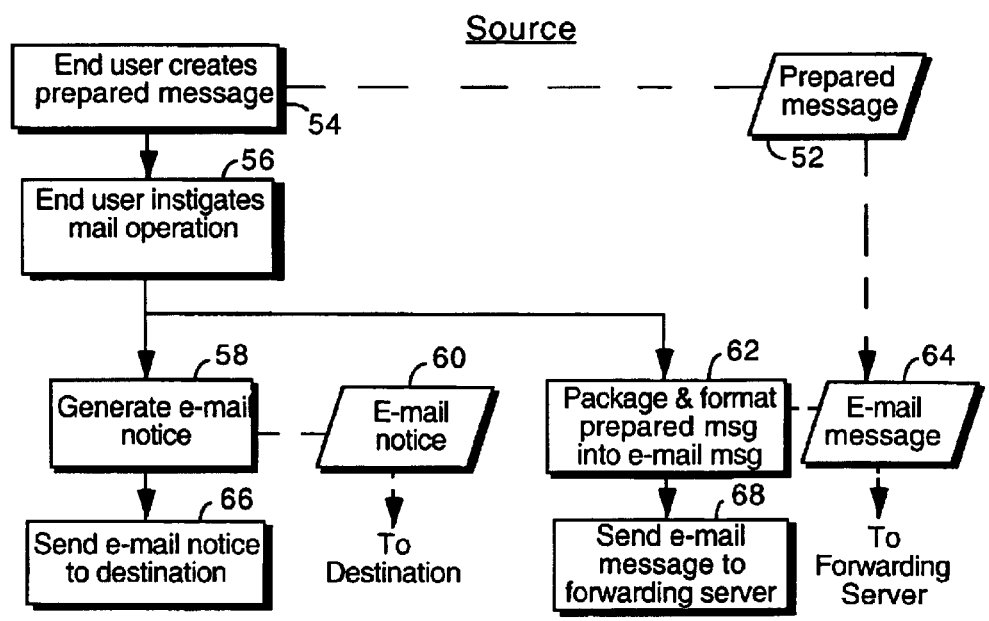
FIG. 4 is a flow chart and data flow diagram of mail message processing at a source location.

Referring to FIG. 4, a sending end user creates a prepared message 52 at step 54 using a text editor, word processor or other file creating application. At step 56, the end user instigates a mail operation, such as by initiating a send command. In response to such command, a messaging application at step 58 generates the e-mail notice 60 and at step 62 generates the e-mail message 64. The messaging application is located at the source location 46 (e.g., the end user's computer/device, the gateway coupled to the end user's computer/device, or the ISP server to which the end user's computer/device connects).

The e-mail notice includes a source address for identifying the source location (or in some embodiments a specific end user), the destination address for identifying the destination location (or in some embodiments the specific end user at the destination location) and a message identifier (ID) which identifies the prepared message. In one embodiment the message identifier is an identification code. In some embodiments the e-mail notice also includes the formatting protocol of the e-mail message. In some embodiments the e-mail notice also includes a message subject or abbreviated message.

The e-mail message 64 includes the prepared message 52 as formatted and packaged for transmission. In some embodiments the prepared message is compressed using conventional binary format compression techniques. The packaging operation includes attaching information similar to that in the e-mail notice: a source address, destination address, protocol, and message ID. At step 66 the e-mail notice is sent over the global information network 10' to the destination location 48. As step 68 the e-mail message is transmitted over the global information network 10' to the forwarding server 50.

Figure 5:
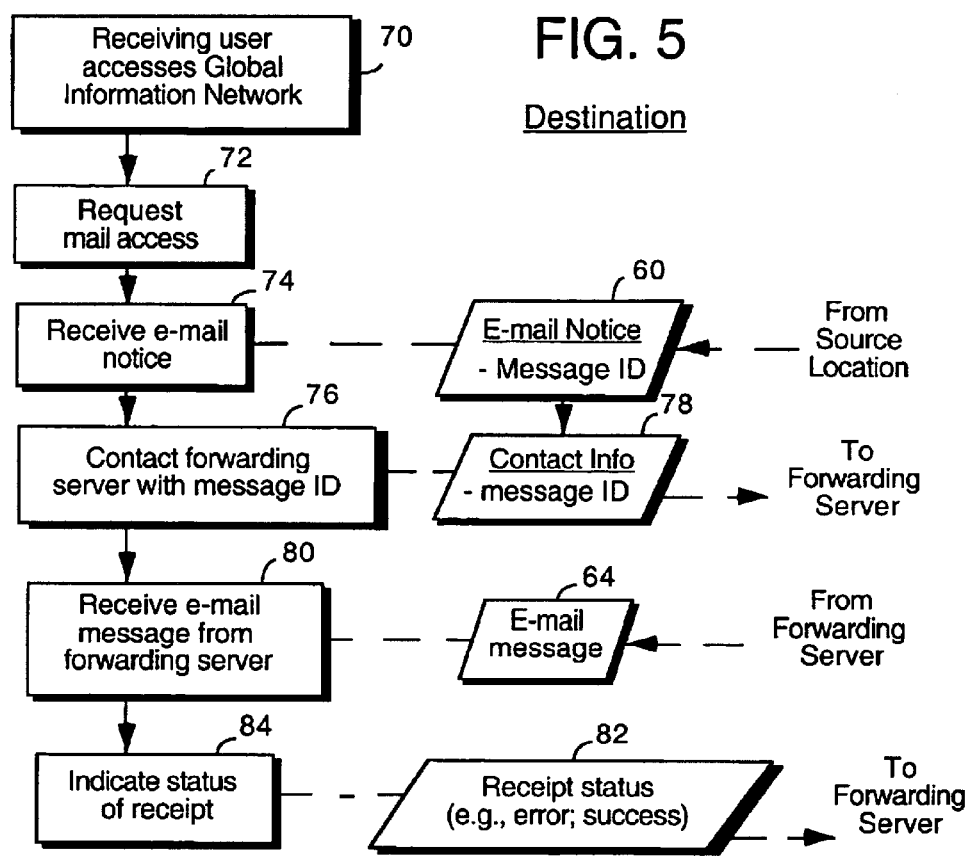
FIG. 5 is a flow chart and data flow diagram of mail messaging processing at a destination location according to one embodiment.

Referring to FIG. 5, at some point after the e-mail notice is sent, the receiving end user at step 70 accesses the global information network 10'. Either automatically or in response to the receiving user command, at step 72 access to the receiving end user's mail is requested. In processing that request, the e-mail notice is received at step 74 and automatically processed using an application program at the destination location 48. Such processing includes parsing the message ID and establishing at step 76 a communication pathway with the forwarding server 50 over the global information network 10'. The destination 48 sends contact information 78 including the message ID to the forwarding server. The destination location 48 waits for the forwarding server 50 to respond (or else, for example, a time-out to occur). If contact is successful, the forwarding server 50 sends the corresponding e-mail message 64 to the destination location. The destination receives the e-mail message 64 at step 80. Upon completion of the transmission, the destination returns a receipt status 82 at step 84 to the forwarding server indicating that there was a transmission error or that the e-mail message 64 was received successfully. The communication link between the forwarding server 50 and destination 48 terminates after a successful transmission. After an error, the link is either terminated or a resend is attempted, according to the embodiment.

Figure 6:
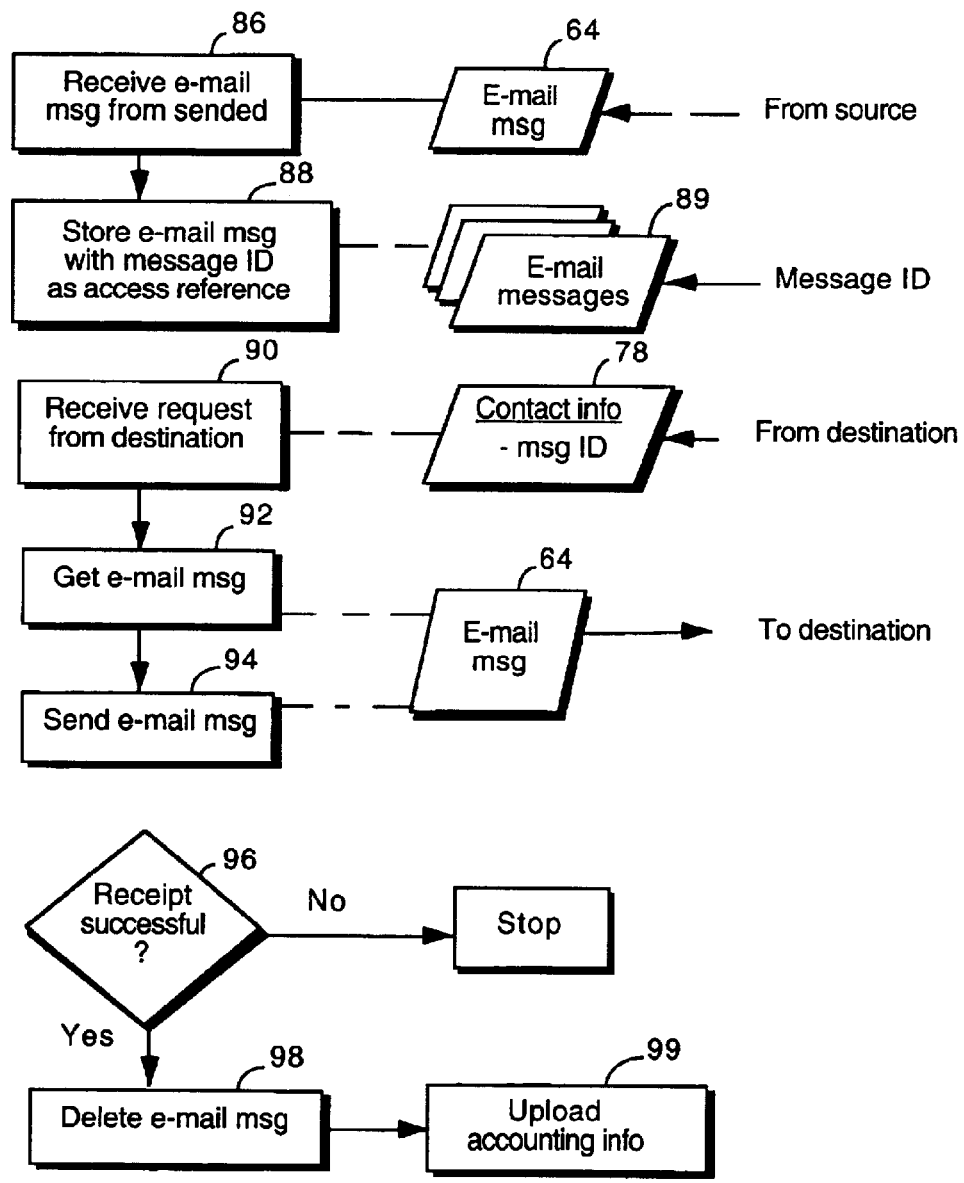
FIG. 6 is flow chart and data flow diagram of mail messaging processing at a forwarding server.

Referring to FIG. 6, operation at the forwarding server 50 includes at step 86 receiving the e-mail message 64 from the source location via the global information network 10'. At step 88 the e-mail message is stored in a database 89 of messages. A message ID is included as part of the e-mail message. Such message ID is stored in a table or other database and used as a pointer, index or other reference for accessing the e-mail message at later time. In some embodiments an expiration date and time also is assigned to the e-mail message. If the e-mail message is still present on the expiration date, the e-mail message 64 is deleted.

At step 90 the forwarding server 50 receives contact from the destination location 48, including the contact information 78. The forwarding server parses out the message ID 60 from the contact information 78 and uses the message ID to retrieve the corresponding e-mail message 64 at step 92. The e-mail message 64 then is transmitted at step 94 to the destination over the global information network 10' using a binary formatting transmission protocol. In some embodiments the protocol is prescribed. In other embodiments, the protocol is included in the e-mail message and/or the contact information. Upon successful transfer of the e-mail message to the destination the e-mail message 64 at step 98 is deleted at the forwarding server 50. In some embodiments the forwarding server tests the receipt status at step 96. If an error in transmission occurs, then the forwarding server stops. The destination either requests a resend (at step 86) or aborts the communication.

Mail-Messaging Method—Alternative Embodiment

In an alternative embodiment, the destination responds to the e-mail notice by attempting to contact both the source location and the forwarding server. The beginning operations by the source end user are the same. Specifically, the sending end user creates the prepared message 52 at step 54 (see FIG. 4) using a text editor, word processor or other file creating application. At step 56, the end user instigates the mail operation, such as by initiating a send command. In response to such command, the messaging application at step 58 generates the e-mail notice 60 and at step 62 generates the e-mail message 64. The messaging application is located at the source location 46 (e.g., the end user's computer/device, the gateway coupled to the end user's computer/device, or the ISP server to which the end user's computer/device connects).

The e-mail notice includes the source address for identifying the source location (or in some embodiments a specific end user), the destination address for identifying the destination location (or in some embodiments the specific end user at the destination location), and a message identifier (ID) which identifies the prepared message. In one embodiment the message identifier is an identification code. In some embodiments the e-mail notice also includes the formatting protocol of the e-mail message. In some embodiments the e-mail notice also includes a message subject or abbreviated message.

The e-mail message 64 includes the prepared message 52 as formatted and packaged for transmission. In some embodiments the prepared message is compressed using conventional binary format compression techniques. The packaging operation includes attaching information similar to that in the e-mail notice: the source address, destination address, protocol, and message ID. At step 66 the e-mail notice is sent over the global information network 10' to the destination location 48. As step 68 the e-mail message is transmitted over the global information network 10' to the forwarding server 50.

Figure 7:
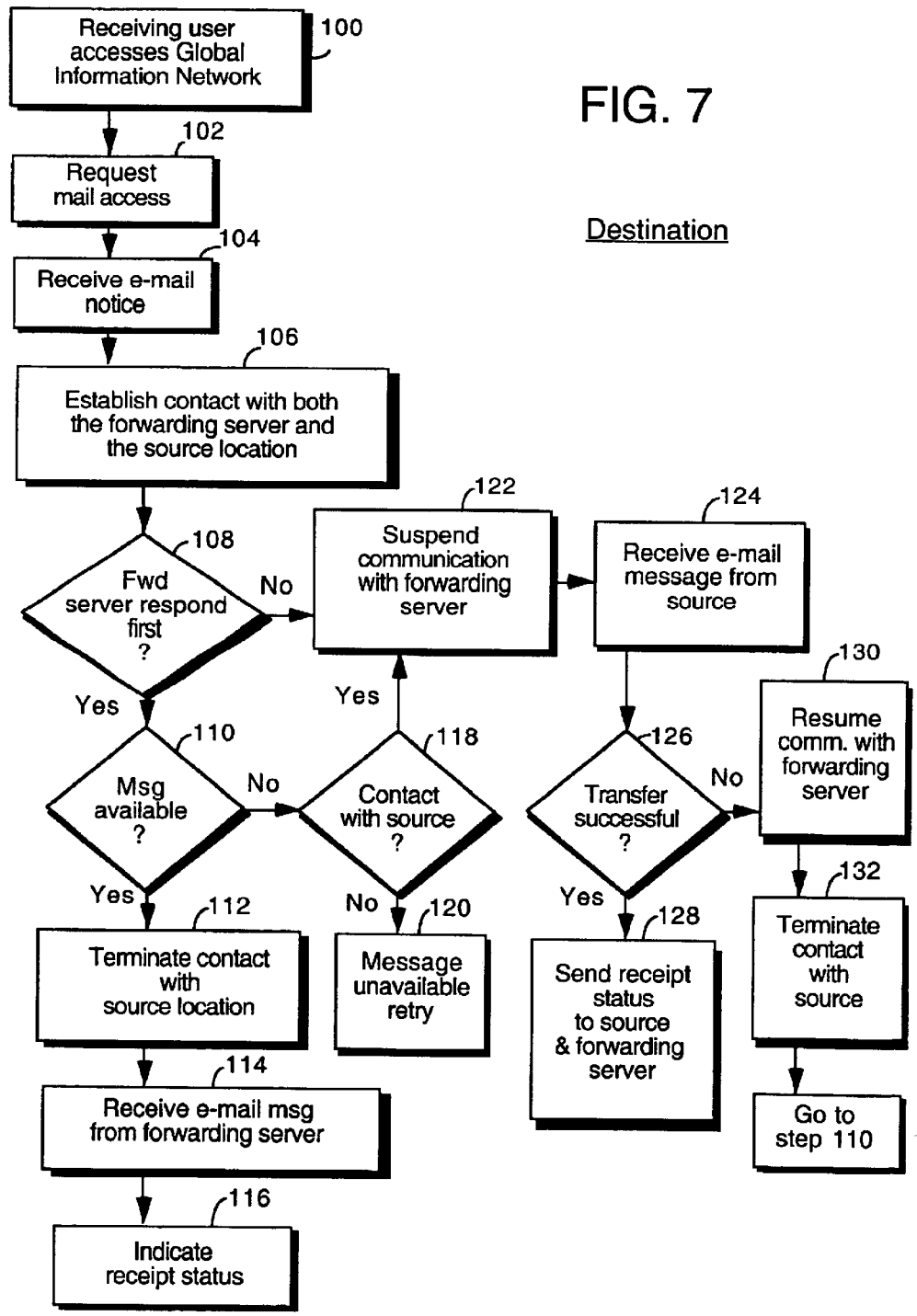
FIG. 7 is a flow chart of mail messaging processing at a destination location according to another embodiment.

Referring to FIG. 7, at some point after the e-mail notice 60 is sent, the receiving end user at step 100 accesses the global information network 10'. Either automatically or in response to the receiving user command, at step 102 access to the receiving end user's mail is requested. In processing that request, the e-mail notice is received at step 104 and automatically processed using an application program at the destination location 48. Such processing includes parsing the message ID and attempting to establish at step 106 a communication pathway with each of the forwarding server 50 and the source location 46 over the global information network 10'. The destination 48 sends contact information 78 including the message ID to the forwarding server 50 and source location 46. The destination location 48 waits for the first to respond.

At step 108 the destination 48 tests whether the forwarding server 50 is the first to respond. If yes, then at step 110 the destination tests the response to determine whether the e-mail message corresponding to the message ID requested is available. If available, then at step 112, contact with the source location is terminated. At step 114, the destination receives the e-mail message 64. Upon successful completion of the transmission, the destination sends a receipt status 82 at step 116 to the forwarding server 50, and in some embodiments to the source location 46, also. If there was a transmission error, then the destination sends the error status to the forwarding server. The communication link between the forwarding server 50 and destination 48 terminates after a successful transmission. After an error, the link is either terminated or a resend is attempted, according to the embodiment.

If at step 110, the e-mail message is unavailable from the forwarding server (e.g. the forwarding server has not received the e-mail message yet), then at step 118 the contact with the source location is tested. If no contact is available with the source location, then at step 120 an indication is given to the receiving end user that the e-mail message 64 is unavailable at this time. Alternatively a retry is attempted.

If at step 108 the source destination is the first to respond, or at step 118 there is contact established with the source location 46, then at step 122 the destination location suspends communication with the forwarding server 50. At step 124, the destination location receives the e-mail message from the source location 46. If at step 126, the transfer is successful, then the destination location 48 sends a receipt status at step 128 to both the source destination and the forwarding server. The forwarding server in response (see step 96 of FIG. 6) deletes the e-mail message stored at the forwarding server at step 98. If the transfer from the source to the destination is not successfully completed, then the destination resumes communication with the forwarding server at step 130. At step 132, the destination location terminates contact with the source location 46. Processing then goes to step 110 to determine whether the e-mail message 64 is available from the forwarding server. Processing continues from step 110 as previously described with either a transmission from the forwarding computer to the destination location (at step 114) or an indication that the message is unavailable (at step 120).

Figure 8:
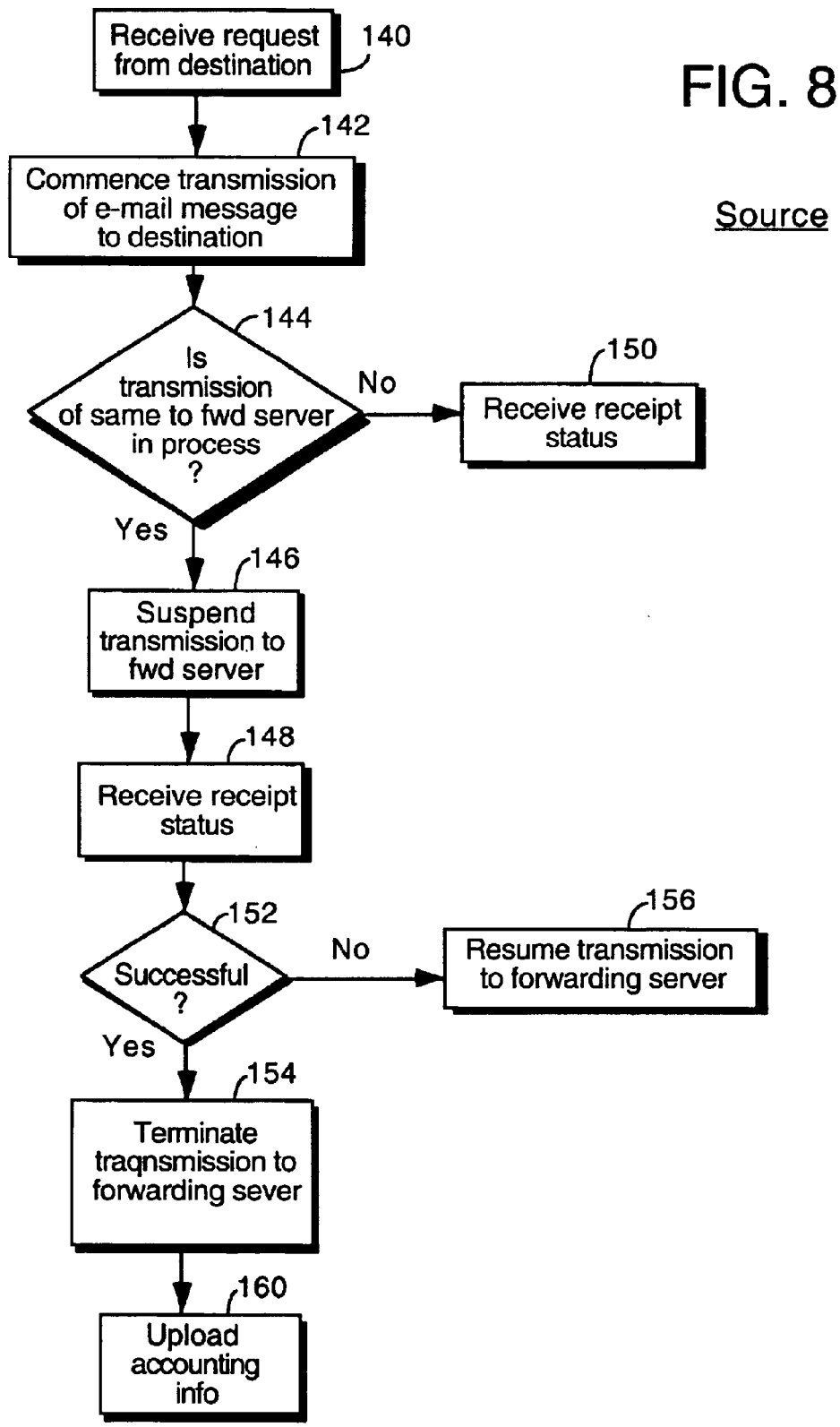
FIG. 8 is a flow chart of a mail messaging application at a source location for responding to a request from the destination location to transmit the mail message.

Referring to FIG. 8, processing at the source 46 is described responsive to the contact from the destination 48. At step 140, the source 46 receives the request from the destination 48 to send the e-mail message 64. The request includes the contact information 78 as previously described. The message ID is parsed from the contact information 78 and used to retrieve the corresponding e-mail message. At step 142 the source 46 commences transmission of the e-mail message to the destination. The source 46 then tests at step 144 whether there also is a transmission of the same e-mail message in process to the forwarding server (e.g., the destination was on-line at the time the e-mail notice was received and responded promptly before the e-mail message 64 was completely transmitted to the forwarding server). If there is such a transmission in process, then at step 146 the transmission to the forwarding server 50 is suspended. At step 148 or 150 the receipt status then is received from the destination (or a timeout occurs indicating that the contact was inadvertently lost or aborted). At step 152 the receipt status is tested. If successful, then at step 154 the transmission to the forwarding server is terminated. If the transfer to the destination unsuccessful, then at step 156 transmission of the e-mail message 64 to the forwarding sever 50 is resumed.

With regard to the operations at the forwarding server, the process is the same as described with regard to FIG. 6. Note however, that at some point during the transmissions involving the forwarding server, the communication may be suspended (see step 122, FIG. 7; see step 146, FIG. 8). Also note that the forwarding server will indicate whether the e-mail message 64 is available for transmission to the destination 48. In some embodiments, the e-mail message is unavailable unless completely received from the source 46. In other embodiments, the e-mail message is available in pieces as it becomes available from the source. In such other embodiments, the operation at step 146 of FIG. 8 does not occur until after a prescribed waiting period. The waiting period is an estimate of the time required for the destination 48 to determine the first to respond at step 108 and terminate contact with the source. In such case, the step 146 is not performed as the process of steps 140–156 is aborted.

Note that the transmission of the e-mail message from the source to either or both of the forwarding server 50 and the destination location 46 is performed using a binary format. Such format uses significantly less bandwidth than the standard UUencoding used for conventional e-mail applications over the Internet.

Message Fee Accounting

According to some embodiments, end users are charged for mail messaging transmission based upon the actual number of bits successfully transmitted. This is achieved in response to a status receipt from the destination of a successful transmission. For a transmission from the source location 46 to the destination location 48 (e.g., steps 124, 128), the source location responds to the status receipt by uploading at step 160 (see FIG. 8) the number of bits successfully transmitted to the destination location 48. For a transmission from the forwarding server 50 to the destination location 48, the forwarding server responds to the status receipt by uploading at step 99 (see FIG. 6) the number of bits successfully transmitted to the destination location 48. Note that in some instances the source or forwarding server receive a successful receipt status wile the other performed the transmission. In the instance where the forwarding server receives such status receipt after a successful transmission between the source and the destination, then there are no bits transmitted from the forwarding server and the destination. Accordingly, there are not duplicate charges.

Conventionally, bandwidth is charged based on the size of the "pipes" that are used, eg. the amount of bits per second that is used. Typically, it is based on the maximum level of bits per second transferred over a time period, rather than the actual number of bits used. Sometimes it is possible, instead, to purchase bandwidth based on the average bandwidth used, which approximates the actual amount of bits transferred. However, these conventional billing methods do not use an actual number of bits transmitted, and further count all of the packet overhead and miscellaneous control information.

By only charging for the actual bits being transferred successfully, it is possible that the invoiced amount is different than the amount of bandwidth used. The number of successful transfers are tallied and uploaded from the source and/or forwarding server to an accounting server. The size of the message is used to calculate the amount that is due for the e-mail message.

Meritorious and Advantageous Effects

According to one advantage of the invention, using a binary protocol has the advantage of being very compressible using standard compression algorithms. According to another advantage of the invention, global information network bandwidth used for electronic messaging is reduced.

Although a preferred embodiment of the invention has been illustrated and described, various alternatives, modifications and equivalents may be used. Therefore, the foregoing description should not be taken as limiting the scope of the inventions which are defined by the appended claims.

What is claimed is:

1. A method for mail-messaging on a global information network, wherein a user generates a prepared message, the method comprising the steps of:

generating the prepared message at a source location;

commencing a first transmission from the source location to a destination address, the first transmission comprising a mail notice, the mail notice excluding the prepared message, the mail notice comprising a source address, a destination address and a message identifier, the message identifier comprising a code for identifying the prepared message;

packaging at the source location the prepared message and the message identifier for said prepared message into a mail message using a binary formatting protocol;

commencing a second transmission from the source location to a forwarding server, the second transmission comprising the mail message, wherein the second transmission is independent of the first transmission;

receiving the first transmission at the destination address; and responding at the destination address to the message identifier of the first transmission by establishing a communication path to receive the mail message at the destination address;

wherein the step of responding comprises;

contacting the forwarding server with the message identifier specified within the mail notice in one communication sent from the destination address along one transmission path;

contacting the source address specified within the mail notice in another communication sent from the destination address alone another transmission path; and determining which one of the source address and the forwarding server respond first to contact with the destination address; and the method further comprising commencing receipt of a transmission of the mail message in the binary formatting protocol from the one of the source address and forwarding server which responds first to contact with the destination address.

2. The method of claim 1, in which establishing a communication path comprises contacting the forwarding server with the message identifier; the method further comprising the steps of:

identifying at the forwarding server the mail message corresponding to the message identifier; and transmitting the mail message from the forwarding server to the destination address using the binary formatting protocol.

3. The method of claim 1, wherein the step of packaging comprises the step of compressing the prepared message.

4. The method of claim 1, further comprising the step of suspending contact with the other one of the source address and forwarding server; and upon successful receipt of the mail message, notifying the sending address and the forwarding server that the mail message has been successfully received.

5. The method of claim 1, further comprising the steps of:

receiving contact at the source address from the destination address;

responsive to receiving contact at the source address, determining whether transmission of the mail message from the source location to the forwarding server is incomplete; and when transmission to the forwarding server is still incomplete, pausing transmission of the mail message from the source location to the forwarding server, and transmitting the mail message from the source location to the destination address using the binary formatting protocol.

6. The method of claim 5, further comprising the steps of:

when transmission of the mail message from the source location to the destination address fails, resuming transmission of the mail message from the source location to the forwarding server; and when transmission of the mail message from the source location to the destination address succeeds, aborting transmission of the mail message from the source location to the forwarding server.

7. The method of claim 1, further comprising the steps of:

determining a tally of bits successfully transmitted to the destination address; and uploading the tally and the source address to an accounting server which allocates a fee, based upon the tally, to an account corresponding to the source address.

8. A mail-messaging system for managing electronic mail communications over global information network, comprising:

a source computer at which a first user generates a prepared message;

a destination computer which receives the prepared message;

a forwarding computer;

a mail program which processes the prepared message at the source computer to generate a mail notice and a mail message, the mail notice comprising a message identifier corresponding to the prepared message and a source address, the mail notice not including an entirety of the prepared message, the mail message comprising the prepared message in a prescribed format and the message identifier;

means for establishing a first communication link between the source computer and the forwarding server along which the mail message is transmitted in a first transmission;

means for establishing a second communication link between the source computer and the destination computer along which the mail notice is transmitted in a second transmission, wherein the second transmission is an independent transmission different than the first transmission;

a mail receipt program which responds to the mail notice at the destination computer to establish a third communication link to receive the mail message at the destination address using a binary formatting transmission protocol;

means for the destination computer to contact the forwarding server with the message identifier specified within the mail notice in one communication sent from the destination address along one transmission path;

means for the destination computer to contact the source address specified within the mail notice in another communication sent from the destination address along another transmission path; and means for determining which one of the source address and the forwarding server respond first to contact with the destination address; and means for commencing receipt of a transmission of the mail message in the binary formatting transmission protocol from the one of the source address and forwarding server which responds first to contact with the destination address.

9. The system of claim 8, further comprising:

means for the destination computer to contact the forwarding server with the message identifier;

means for identifying at the forwarding server the mail message corresponding to the message identifier; and means for transmitting the mail message from the forwarding server to the destination address using the binary formatting transmission protocol.

10. The system of claim 8, further comprising:

means for suspending contact with the other one of the source address and forwarding server; and means for notifying the sending address and the forwarding server, upon successful receipt of the mail message, that the mail message has been successfully received.

11. The system of claim 8, further comprising:

means for receiving contact at the source address from the destination address;

means, responsive to receiving contact at the source address, for determining whether transmission of the mail message from the source location to the forwarding server is incomplete; and means for pausing transmission of the mail message from the source location to the forwarding server when transmission to the forwarding server is still incomplete; and means for transmitting the mail message from the source location to the destination address using the binary formatting transmission protocol.

12. The system of claim 11, further comprising:

means for resuming transmission of the mail message from the source location to the forwarding server when transmission of the mail message from the source location to the destination address fails; and means for aborting transmission of the mail message from the source location to the forwarding server when transmission of the mail message from the source location to the destination address succeeds.

13. The system of claim 8, further comprising:

means for determining a tally of bits successfully transmitted to the destination address; and means for uploading the tally and the source address to an accounting server which allocates a fee, based upon the tally, to an account corresponding to the source address.

* * * * *

UNITED STATES PATENT AND TRADEMARK OFFICE
CERTIFICATE OF CORRECTION

PATENT NO. : 6,950,854 B2
DATED : September 27, 2005
INVENTOR(S) : Clinton L. Ballard It is certified that error appears in the above-identified patent and that said Letters Patent is hereby corrected as shown below:

Column 10,
Line 9, change "a forwarding computer" to -- a forwarding server --.
Line 29, change "at the destination" to -- at a destination --.

Signed and Sealed this

Tenth Day of January, 2006

JON W. DUDAS
*Director of the United States Patent and Trademark Office*